March 19, 1935. E. R. JACOBY 1,994,518
ENGINE
Filed Feb. 4, 1931
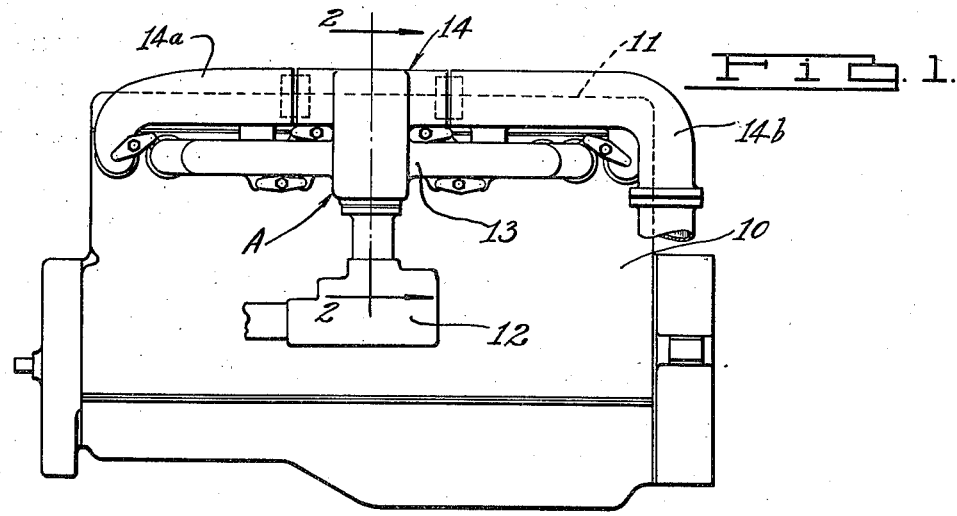
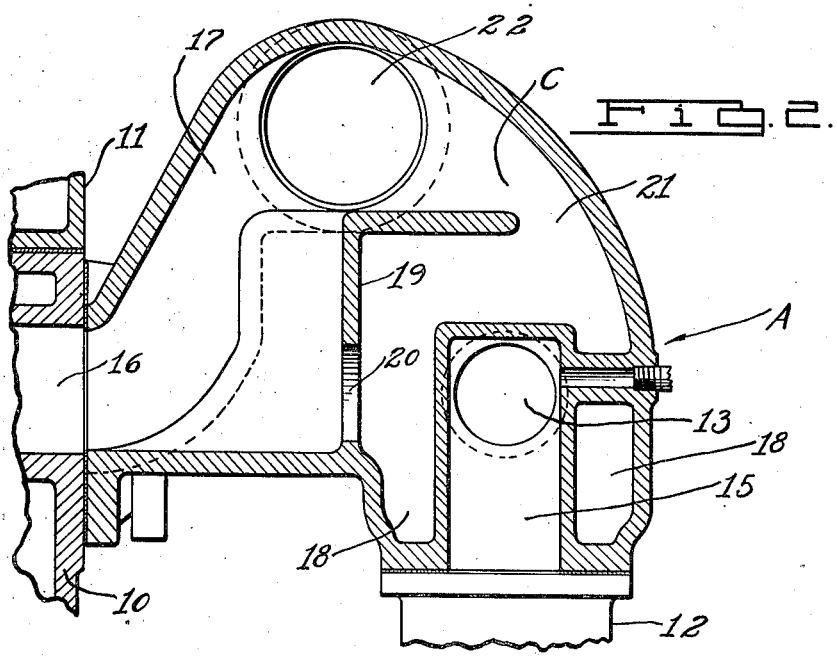
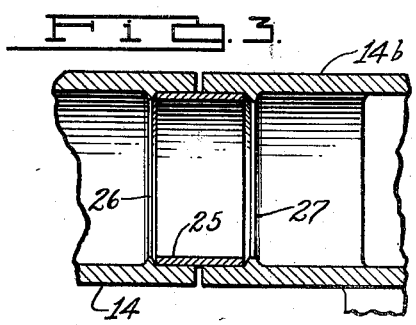
INVENTOR.
Enos R. Jacoby
BY
ATTORNEY.

Patented Mar. 19, 1935

1,994,518

UNITED STATES PATENT OFFICE 1,994,518

ENGINE

Enos R. Jacoby, Detroit, Mich., assignor to Continental Motors Corporation, Detroit, Mich., a corporation of Virginia Application February 4, 1931, Serial No. 513,339

18 Claims. (Cl. 123—122)

My invention relates to internal combustion engines and more particularly relates to a manifold structure therefor including automatically controlled means for heating the intake gases in accordance with the engine requirements.

In general, heating devices for the intake manifolds of internal combustion engines are usually provided with valve means actuated in response to temperature variations of the intake manifold or heating device for controlling the flow of exhaust gases through said heating device. Other devices having a heating device in open communication with the exhaust manifold in general are too hot at relatively high engine speeds and thus the efficiency of such engines is greatly impaired when operated at high speeds or insufficient heat is obtained at low engine speeds if the device is adjusted to give the proper amount of heat at high engine speeds.

It is an object of my invention to construct an internal combustion engine that may be efficiently operated at various speeds by providing an automatically controlled heating device for heating the intake gases of said engine, said heating device being arranged in open communication with the exhaust manifold.

Another object of my invention is to provide an automatic control for an intake manifold heating device that is arranged in open communication with the exhaust manifold of the engine by providing controlling means automatically responsive to the pressure within said exhaust manifold for regulating the flow of exhaust gases through said heating device.

A further object of my invention is to facilitate the manufacture and assembly of a manifold structure of an internal combustion engine by providing a sectional manifold structure.

For a further understanding of my invention, reference may be had to the accompanying drawing which illustrates one form which my invention may assume, and in which:

Figure 1 is a side elevational view of an internal combustion engine embodying a manifold structure constructed in accordance with my invention.

Figure 2 is a transverse sectional view of the manifold structure taken on the line 2—2 of Figure 1, and Figure 3 is a detail sectional view illustrating the assembly of the manifold sections.

In general, my novel manifold structure A is incorporated with an internal combustion engine having a cylinder block 10, a cylinder head structure 11 secured to said block and a fuel mixing device 12 adapted for cooperative connection with an intake manifold portion 13. An exhaust manifold 14 is associated therewith and means are provided for conducting a portion of the exhaust gases in heat transference relation with the intake manifold portion for heating the incoming fuel mixture.

My novel manifold structure is provided with a riser portion 15 communicating with the fuel mixing device 12 and with the intake manifold portion 13. The exhaust gases from a part of the engine are exhausted through the cylinder exhaust port 16 into an exhaust manifold portion 17, a heating jacket or by-pass 18 being arranged around the riser portion 15 of the intake manifold portion, and said heating jacket being arranged in open communication with the exhaust manifold portion 17.

The heating jacket 18 is separated from the exhaust manifold portion 17 by the wall 19 which is provided with an inlet opening or port 20 that is preferably arranged substantially opposite to the cylinder exhaust port 16, (see Figure 2) and with a restricted outlet opening or port 21. Thus the exhaust gases from port 16 may be either wholly or partially conducted through the heating jacket 18 in heat transference relation with at least a portion of the intake manifold portion associated therewith. It will be noted that the wall 19 partially overlies the top of the riser 15, and the restricted opening 21 may be of any predetermined size. The exhaust manifold portion 17 communicates with the outlet portions 22 and the exhaust gases from port 16 are conducted through the intake opening 20, the heating jacket or by-pass 18, through the opening 21 and thence through the outlet 22 into the main exhaust manifold 14.

At relatively low engine speeds substantially all the exhaust gases from port 16 pass through the by-pass or heating jacket 18. As the speed of the engine increases more exhaust gas is exhausted from port 16 and also from the other exhaust ports communicating with the main exhaust manifold 14. The increased volume of exhaust gases creates an increased back pressure in the exhaust manifold and particularly in the pocket C or other recess which is positioned adjacent the restricted opening 21 thereby retarding the free flow of gases through the restricted opening 21, and thus a proportionally less volume of exhaust gases is conducted through said by-pass or heating jacket 18 at relatively higher engine speeds.

It may be noted that the arrangement whereby inlet port 20 is located opposite to exhaust port 16 provides a construction in which full advantage of velocity pressures may be taken. This velocity pressure is of course relatively low at low engine speeds and high at high engine speeds. With a heater of usual construction having an outlet of equal area as the inlet, the result would be an increased flow of exhaust gas through the heater jacket for increased engine speed. But applicant has provided a restricted outlet opening 21 by constructing the opening 21 smaller in area than the inlet opening 20. Thus as engine speed is increased the back pressure within the heater jacket is rapidly built up because of this restricted opening 21 and such back pressure quickly overcomes the velocity pressure and retards the flow of exhaust gas through said heater jacket.

In addition to the aforesaid means for retarding circulation of exhaust gas through the heater jacket, the exhaust gas pressure builds up in the manifold externally of said restricted opening to further retard the flow of exhaust gas through said heater jacket. Thus applicant has provided means for varying the quantity of exhaust gas flowing through the heater jacket in response to engine speed variations, the back pressure within the heater jacket being increased as well as the pressure in the manifold adjacent the heater outlet to obtain this control.

This latter control may be particularly described as follows.

Increased engine speeds provide an additional volume of exhaust gases to be carried away in the exhaust manifold, and with heating jackets having communicating openings intermediate the jacket and exhaust manifold of fixed size there would normally be a corresponding proportional increase in the volume of exhaust gas flowing through the jacket, and in general such an increased amount of heat is undesirable at relatively high engine speeds. Thus a construction embodying the principle shown in the illustrated embodiment of my invention proportionally varies the volume of gases caused to flow through the by-pass or heating jacket. In particular, the increase in the volume of gases caused to flow through the heating jacket in my device is not proportionally as great as the increase of gases exhausted from the engine, since the pressure in pocket C adjacent to the restricted outlet opening or port 21 is increased under increased engine speeds and this increased back pressure tends to prevent the free discharge of gases through said outlet opening 21, thereby retarding the flow of gases through said heating jacket or by-pass 18. As the engine speed is reduced the pressure in pocket C is correspondingly reduced and less resistance is offered to the free discharge of gases through said outlet opening 21, thereby permitting a greater proportional volume of gases to flow through the heating jacket at relatively slow engine speeds.

It will thus be seen that I have provided an automatic control for regulating the flow of exhaust gases through said heating jacket as the speed of the engine is varied, making it possible to thus uniformly heat the intake gases for various engine speeds.

The main exhaust manifold 14 is constructed of sections 14a and 14b which may be secured to the manifold structure A. Preferably the exhaust manifold sections 14a and 14b have substantially the same inside and outside diameters as the outlet opening 22, and a tubular sleeve 25 or other coupling device is employed for joining the sections 14a and 14b to the structure A. Preferably the outlet opening 22 and sections 14a and 14b are provided with internal annular ribs 26 and 27 respectively which form seats adapted for engagement by the sleeve coupling 25. The sectional construction herein illustrated provides a manifold structure of economical manufacture and which may be very readily assembled with the engine. Obviously the branches 13 of the intake manifold may be similarly constructed if so desired.

Although I have illustrated but one form of my invention and have described in detail but a single application thereof, it will be apparent to those skilled in the art to which my invention pertains that various modifications and changes may be made therein without departing from the spirit of my invention or from the scope of the appended claims.

What I claim as my invention is:

1. A manifold structure for an internal combustion engine comprising an intake manifold portion, an exhaust manifold portion associated therewith, a heater jacket arranged in heat transference relation with said intake manifold portion and having an intake port and a restricted outlet port in communication with said exhaust manifold portion, said manifold structure being constructed to provide a pocket in said exhaust manifold portion adjacent said restricted outlet port and in which back pressure is built-up in accordance with the speed of the engine for regulating the flow of exhaust gases through said heater jacket.

2. A manifold structure for an internal combustion engine having an intake manifold and comprising an exhaust manifold portion and a by-pass communicating therewith and arranged for conducting a portion of the exhaust gases in heat transference relation with said intake manifold, said exhaust manifold portion provided with a pocket located adjacent the outlet of said by-pass and which is subjected to varying amounts of back pressure responsive to the speed of the engine to vary the resistance to the flow of gases through the by-pass outlet for regulating the flow of gases through said by-pass.

3. A manifold structure for an internal combustion engine comprising an intake manifold, an exhaust manifold, and a by-pass arranged for conducting a portion of said exhaust gases in heat transference relation with said intake manifold, said by-pass having an inlet opening and outlet opening communicating with said exhaust manifold, the pressure of said exhaust gases varying directly with the engine speed and adapted for providing varying resistance to the flow of said gases through the outlet opening to vary the flow through said by-pass.

4. A manifold structure for an internal combustion engine comprising an intake manifold, an exhaust manifold, and a by-pass arranged for conducting a portion of said exhaust gases in heat transference relation with said intake manifold, said by-pass having an inlet opening and an outlet opening communicating with said exhaust manifold; the said manifold structure constructed to provide a pocket adjacent the outlet opening in open communication with the exhaust manifold in which the pressure of said exhaust gases is varied directly with the engine speed and adapted for providing varying resistance to the flow of said gases through the outlet opening to vary the flow through said by-pass.

5. In a manifold structure for an internal combustion engine, an exhaust manifold portion, a heater portion provided with spaced inlet and outlet ports respectively communicating with said exhaust manifold portion, and an intake manifold portion associated therewith and arranged in heat transference relation with said heater portion, the pressure of the exhaust gas in said exhaust manifold portion adjacent said heater outlet port acting to control the exhaust gas flow through said heater portion.

6. In a manifold structure for an internal combustion engine, an exhaust manifold portion, a heater portion provided with spaced inlet and outlet ports respectively communicating with said exhaust manifold portion, and an intake manifold portion associated therewith and arranged in heat transference relation with said heater portion, said exhaust manifold portion having an offset portion adjacent said heater outlet port adapted to provide a pressure zone for controlling the exhaust gas flow through said heater portion.

7. In a manifold structure for an internal combustion engine, an exhaust manifold portion, a heater portion provided with spaced inlet and outlet ports respectively communicating with said exhaust manifold portion, and an intake manifold portion associated therewith and arranged in heat transference relation with said heater portion, said exhaust manifold portion constructed to provide a pressure zone in the vicinity of the heater outlet for controlling the exhaust gas flow through said heater portion in response to engine speed variations.

8. In a manifold structure for an internal combustion engine, an exhaust manifold portion, a heater portion provided with spaced inlet and outlet ports respectively communicating with said exhaust manifold portion, and an intake manifold portion associated therewith and arranged in heat transference relation with said heater portion, said exhaust manifold portion constructed to provide a pressure zone cooperating with the heater outlet for controlling the exhaust gas flow through said heater portion in response to engine speed variations.

9. In a manifold structure for an internal combustion engine, an exhaust manifold portion, a heater portion provided with spaced inlet and outlet ports respectively communicating with said exhaust manifold portion, and an intake manifold portion associated therewith and arranged in heat transference relation with said heater portion intermediate said heater inlet and outlet ports, said exhaust manifold portion being constructed to provide a pressure zone cooperating with the heater outlet for controlling the exhaust gas flow through said heater portion.

10. A manifold structure for an internal combustion engine comprising an intake manifold portion, an exhaust manifold portion associated therewith and having an exhaust gas inlet port, a heater jacket arranged in heat transference relation with said intake manifold portion and having an inlet opening arranged adjacent to said exhaust gas inlet port whereby to utilize velocity pressures of said exhaust gas for inducing circulation of exhaust gas through said heater jacket, said heater jacket having a restricted outlet opening whereby to induce an increase in back pressure within said heater jacket for increased engine speeds whereby to relatively increase the resistance to the flow of exhaust gas through said heater jacket for varying the quantity of exhaust gas flowing through the heater jacket in response to engine speed variations.

11. An engine manifold structure including an exhaust manifold portion and an intake manifold portion, and a heater jacket arranged in heat transference relation with said intake manifold portion and having inlet and outlet openings arranged in open communication with said exhaust manifold portion, said outlet opening being of relatively smaller area than said inlet opening.

12. An engine manifold structure including an exhaust manifold portion and an intake manifold portion, and a heater jacket arranged in heat transference relation with said intake manifold portion and having inlet and outlet openings arranged in open communication with said exhaust manifold portion, said outlet opening being of relatively smaller area than said inlet opening, said exhaust manifold portion having an inlet port substantially aligned with said heater inlet opening.

13. In a manifold structure for an internal combustion engine, an exhaust manifold portion, a heater portion having inlet and outlet openings communicating with said exhaust portion, and an intake manifold portion associated therewith and arranged in heat transference relation with said heater portion, said exhaust manifold portion including a pressure zone adjacent to the outlet opening of said heater portion and offset to one side of the direct exhaust gas flow, the pressure of the gases in said zone being variable under different conditions of engine loading and acting to control exhaust gas flow through the outlet opening of said heater portion whereby to control the heating of said intake manifold portion.

14. In a manifold structure for an internal combustion engine, an exhaust gas conducting portion, a heater portion having inlet and outlet openings communicating with said exhaust gas conducting portion and offset with respect to the direct exhaust gas flow, and an intake manifold portion associated therewith and arranged in heat transference relation with said heater portion, said exhaust gas conducting portion including a pressure zone adjacent to the outlet opening of said heater portion and offset to one side of the direct exhaust gas flow, the pressure of the gases in said zone being variable under different conditions of engine loading and acting to control exhaust gas flow through the outlet opening of said heater portion whereby to control the heating of said intake manifold portion.

15. A manifold structure for an internal combustion engine comprising an exhaust manifold portion, an intake manifold portion, and a baffle spaced from said intake manifold portion to provide a well lying intermediate the baffle and said intake manifold portion and communicating with said exhaust manifold portion, the quantity of exhaust gases circulated in said well being varied in response to variations in velocity of the exhaust gases in said exhaust manifold portion.

16. A manifold structure for an internal combustion engine comprising an intake manifold portion, an exhaust manifold portion associated therewith, a heater jacket arranged in heat transference relation with said intake manifold portion and in open communication with the said exhaust manifold portion, said exhaust manifold portion constructed to provide a pressure zone offset to one side of the direct exhaust gas flow whereby to provide control means acting in response to the pressure of the exhaust gases in said exhaust manifold portion during engine 17. A manifold structure for an internal combustion engine comprising an intake manifold portion, an exhaust manifold portion associated therewith and having a pressure zone offset with respect to said direct exhaust gas flow, a heater jacket arranged in heat transference relation with said intake manifold portion and having inlet and outlet portions communicating respectively with said exhaust manifold portion and said pressure zone, the varying pressure of the exhaust gases in the pressure zone of said exhaust manifold portion resulting from different conditions of engine operation acting to regulate the quantity of exhaust gases flowing through said heater jacket.

18. A manifold structure for an internal combustion engine comprising an intake manifold portion, an exhaust manifold portion associated therewith and having a pressure zone offset with respect to said direct exhaust gas flow, a heater jacket arranged in heat transference relation with said intake manifold portion and communicating with said exhaust manifold portion, said jacket having an outlet communicating with said zone, the pressure of the exhaust gases in the pressure zone of said exhaust manifold portion being variable under different conditions of engine loading and acting in response to engine loading to regulate the quantity of exhaust gases flowing through said heater jacket outlet.

ENOS R. JACOBY.